(12) United States Patent
Dai et al.

(10) Patent No.: US 8,252,405 B2
(45) Date of Patent: Aug. 28, 2012

(54) SINGLE-WALLED CARBON NANOTUBES AND METHODS OF PREPARATION THEREOF

(75) Inventors: Hongjie Dai, Cupertino, CA (US); David Mann, Stanford, CA (US); Guangyu Zhang, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1221 days.

(21) Appl. No.: 11/588,873

(22) Filed: Oct. 26, 2006

(65) Prior Publication Data

US 2010/0098904 A1  Apr. 22, 2010

Related U.S. Application Data

(60) Provisional application No. 60/731,042, filed on Oct. 27, 2005, provisional application No. 60/813,189, filed on Jun. 12, 2006.

(51) Int. Cl.
*B23B 7/00* (2006.01)
*B44C 1/165* (2006.01)
*D01F 9/12* (2006.01)

(52) U.S. Cl. ..... 428/119; 156/230; 156/236; 423/447.1; 423/447.3; 977/843; 977/847

(58) Field of Classification Search ............... 423/447.1, 423/447.2, 447.3; 428/119; 156/230, 236; 977/842–848
See application file for complete search history.

(56) References Cited

U.S. PATENT DOCUMENTS

| | | | |
|---|---|---|---|
| 4,749,440 A * | 6/1988 | Blackwood et al. | .......... 438/706 |
| 6,232,706 B1 | 5/2001 | Dai et al. | |
| 6,297,592 B1 | 10/2001 | Goren et al. | |
| 6,331,209 B1 | 12/2001 | Jang et al. | |
| 6,416,820 B1 | 7/2002 | Yamada et al. | |
| 6,730,972 B2 | 5/2004 | Ravi et al. | |
| 6,773,954 B1 | 8/2004 | Subramanian et al. | |
| 6,787,122 B2 | 9/2004 | Zhou | |
| 6,858,197 B1 | 2/2005 | Delzeit | |
| 6,863,942 B2 | 3/2005 | Ren et al. | |
| 6,919,063 B2 | 7/2005 | Jana et al. | |
| 6,949,237 B2 | 9/2005 | Smalley et al. | |
| 6,967,013 B2 | 11/2005 | Someya et al. | |
| 6,982,519 B2 | 1/2006 | Guillorn et al. | |
| 6,986,876 B2 | 1/2006 | Smalley et al. | |
| 6,994,907 B2 | 2/2006 | Resasco et al. | |
| 7,038,299 B2 | 5/2006 | Furukawa et al. | |
| 2003/0216502 A1 * | 11/2003 | McElrath et al. | ............. 524/507 |

OTHER PUBLICATIONS

Saran, et al., Fabrication and Characterization of Thin Films of Single-Walled Carbon Nanotube Bundles on Flexible Plastic Substrates, J. Am. Xhem. Soc. 2004; 126: 4462-4463.*

Dresselhaus, et al., Carbon Nanotubes Synthesis, Structure, Properties, and Applications, Topics in Applied Physics 2001; 80: 1-9, 12-19.*

Zhang, et al., Ultra-high-yield growtn of vertical single-walled carbon nanotubes: Hidden roles of hydrogen and oxygen, PNAS 2005; 102(45): 16141-16145.*

Lee, et al., J. Alloys Cmpds. 2002; 330-332: 569-573.*

(Continued)

*Primary Examiner* — Daniel C. McCracken
(74) *Attorney, Agent, or Firm* — Crawford Maunu PLLC

(57) ABSTRACT

The present invention provides single-walled carbon nanotubes and systems and methods for their preparation.

8 Claims, 8 Drawing Sheets

OTHER PUBLICATIONS

Kong, et al., Chemical vapor deposition of methane for single-walled carbon nanotubes, Chemical Physics Letters 1998; 292: 567-574.*

Min, et al., Low-Temperature Growth of Single-Walled Carbon Nanotubes by Water Plasma Chemical Vapor Deposition, J. Am. Chem. Soc. 2005; 127(36): 12498-12499.*

Huang, et al., Patterned Growth and Contact Transfer of Well-Aligned Carbon Nanotube Films, J. Phys. Chem. B. 1999; 103: 4223-4227.*

Benndorf, C., et al., "Mass and optical emission sectroscopy of plasmas for diamond-synthesis", (1994) Pure & Appl. Chem. 66, 1195-1206.

Dai, "Carbon nanotubes: opportunities and challenges", Surf. Sci. 500, (2002), 218-241.

Eaton, S., et al., "Construction of a new C-H-O ternary diagram for diamond deposition from the vapor phase", Diamond and Related Mater. 9, (2000), 1320-1326.

Fan, S. et al., "Self-Oriented Regular Arrays of Carbon Nanotubes and Their Field Emission Properties", Science 283, (1999), 512-514.

Haffner, J. et al., "Catalytic growth of single-wall carbon nanotubes from metal particles", Chem. Phys. Lett. 296, (1998), 195-202.

Hata, K. et al., "Water-Assisted Highly Effieicnet Synthesis of Impurity-Free Single-Walled Carbon Nanotubes", Science, 306, (2004), 1362-4.

Jiang, K. et al., "Spinning continuous carbon nanotube yarns", Nature 419, (2002), 801.

Jorio, A. et al., "Carbon Nanotube Photophysics", MRS Bulletin, (2004), 276-80.

Kitiyanan, B., et al., "Controlled production of single-wall carbon nanotubes by catalytic decomposition of CO on bimetallic Co-Mo catalysts", Chem. Phys. Lett. 317 (2000), 497-503.

Kong, J., et al., "Synthesis of individual single-walled carbon nanotubes on patterned silicon wafers", Nature 395, (1998), 878-881.

Li, Y., et al., "Preferential Growth of Semiconducting Single-Walled Carbon Nanotubes by a Plasma Enhanced CVD Method", Nano Lett. 4, (2004), 317-321.

Li, W., "Large-Scale Synthesis of Aligned Carbon Nanotubes", Science 274, (1996), 1701-1703.

Maruyama, S. et al., "Low-temperature synthesis of high-purity single-walled carbon nanotubes from alcohol", Chem. Phys. Lett. 360, (2002), 229-234.

Melechko, A., et al., "Vertically aligned carbon nanofibers and related structures: Controlled synthesis and directed assembly", J. Appl. Phys. 97, (2005), 041301.

Murakami, Y., et al., "Direct synthesis of high-quality single-walled carbon nanotubes on silicon and quartz substrates", Chem., Phys. Lett. 377, (2003), 49-54.

Murakami, Y., et al., "Growth of vertically aligned single-walled carbon nanotube filsm on quartz substrates and their optical anistropy", Chem. Phys. Lett. 385, (2004), 298-303.

Nikitin, A., "Hydrogenation of Single-Walled Carbon Nanotubes", Phys. Rev. Lett. 95, (2005), 225507.

Nikolaev, P., et al., "Gas-phase catalytic growth of single-walled carbon nanotubes from carbon monoxide", Chem. Phys. Lett. 313, (1999), 91-97.

Park, S. et al., "Generalized Chemical Reactivity of Curved Surfaces: Carbon Nanotubes", Nano Lett. 3, (2003), 1273-1277.

Ren, Z.F., et al., "Synthesis of Large Arrays of Well Aligned Carbon Nanotubes on Glass", Science 282, (1998), 1105-7.

Zhang, G., et al., "Ultra-high-yield growth of vertical single-walled carbon nanotubes: Hidden roles of hydrogen and oxygen", PNAS 102, (2005), 16141-16145.

* cited by examiner

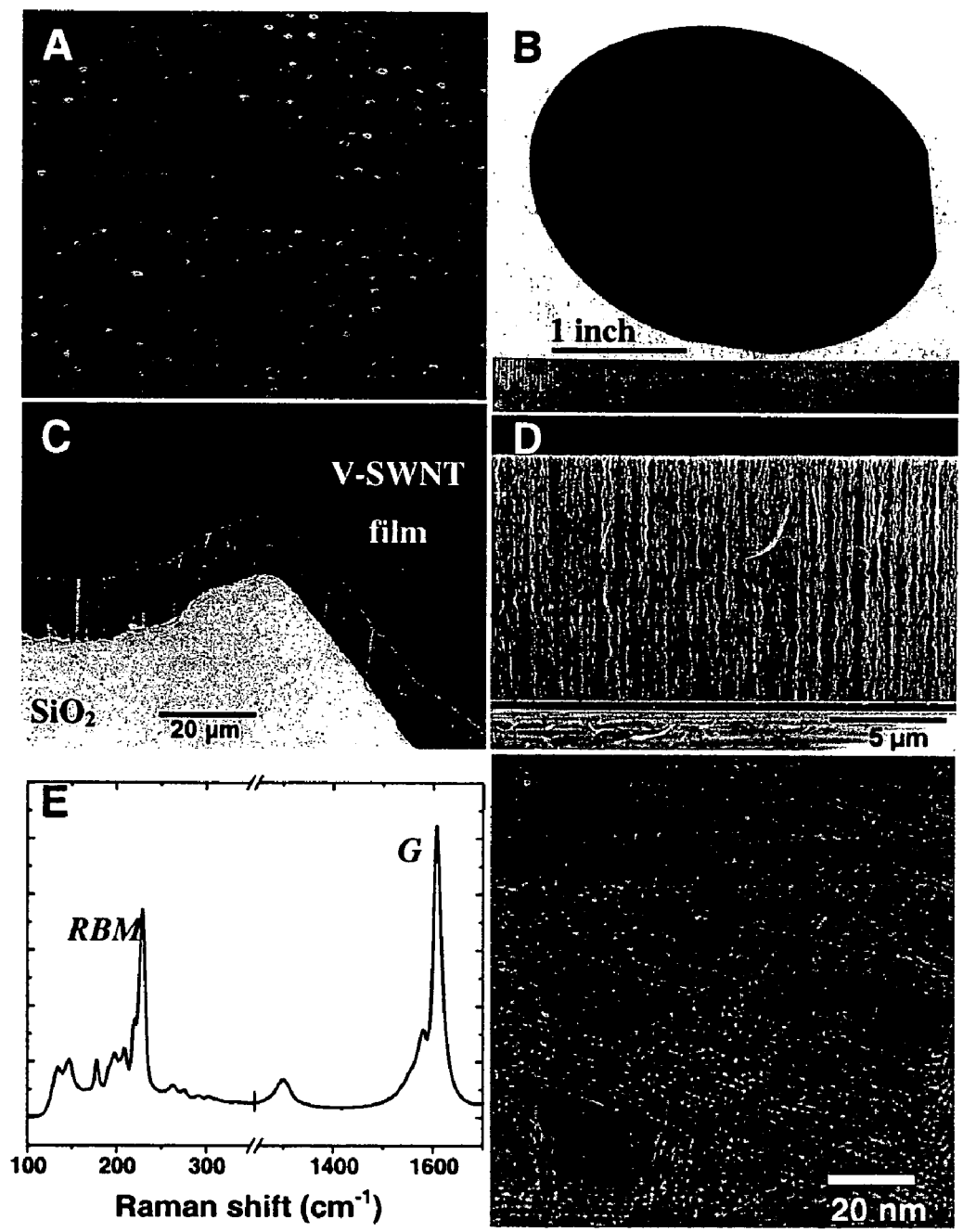
Figures 1a-f

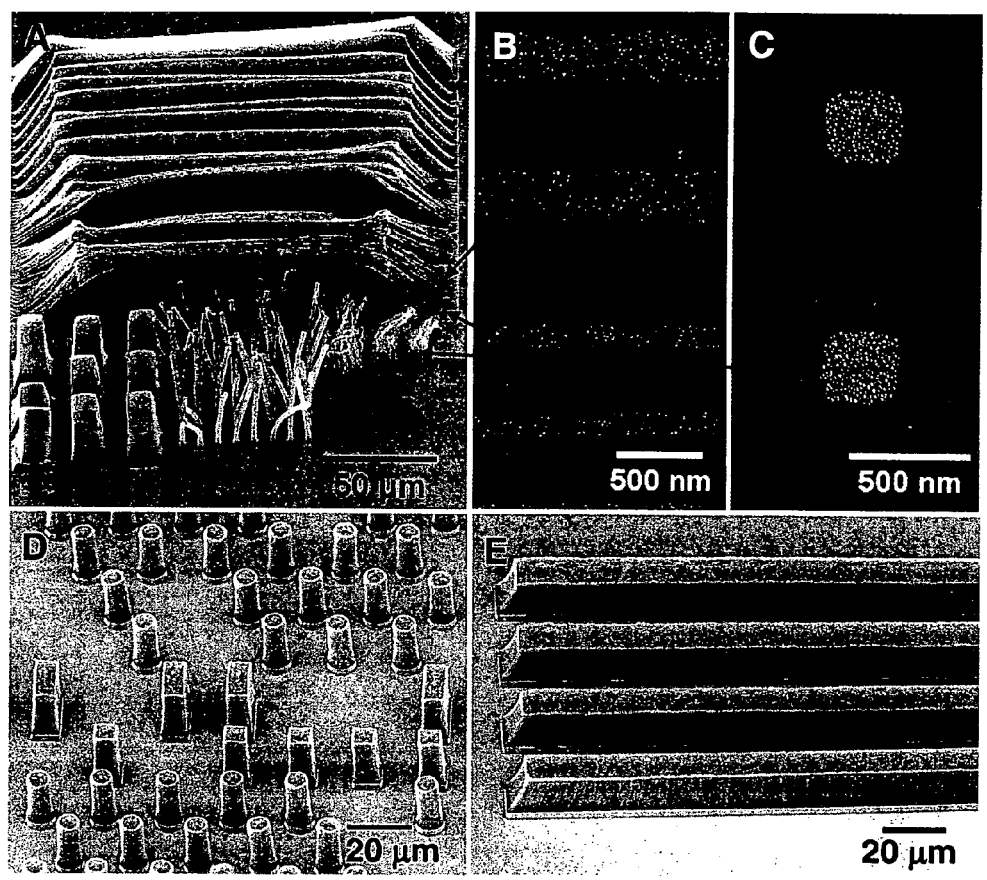
Figures 2a-e

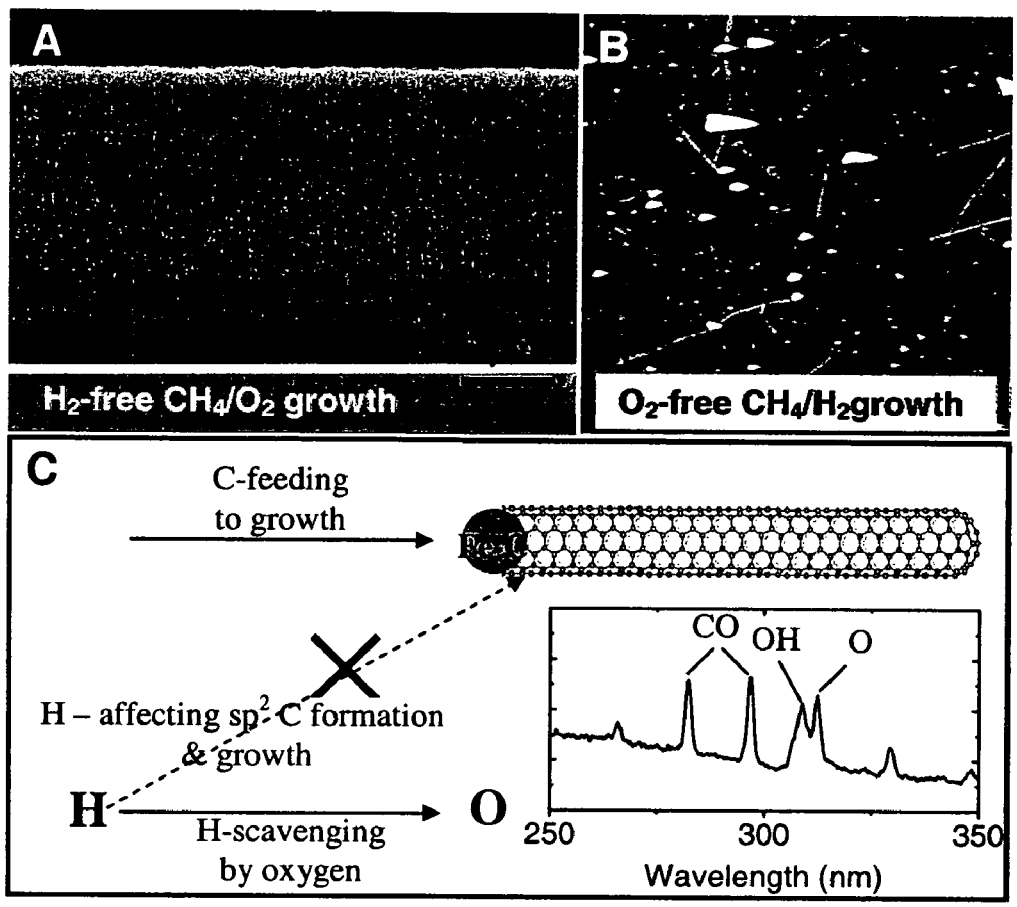
Figures 3a-c

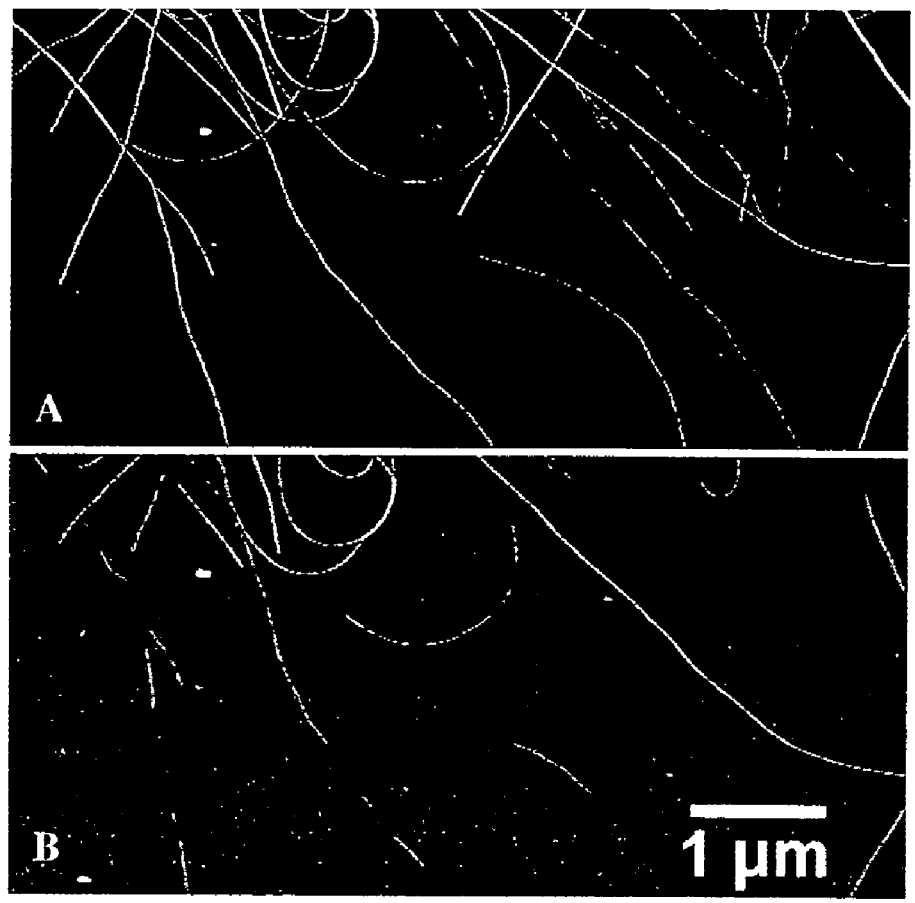
Figures 4a-b

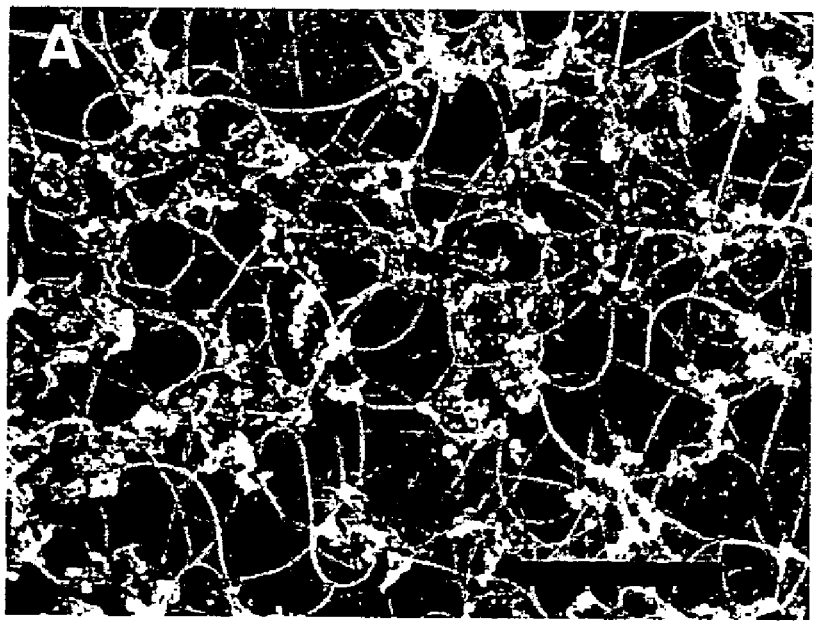
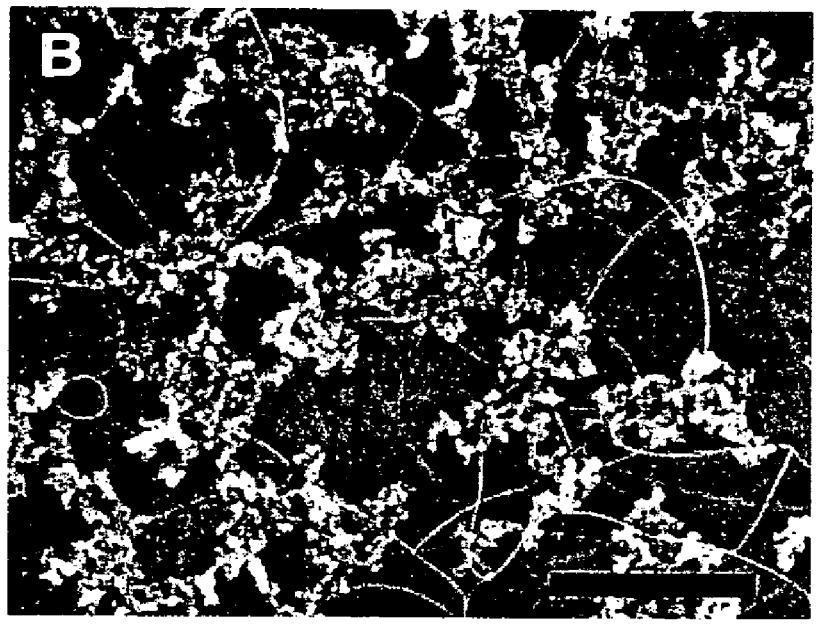
Figures 5a-b

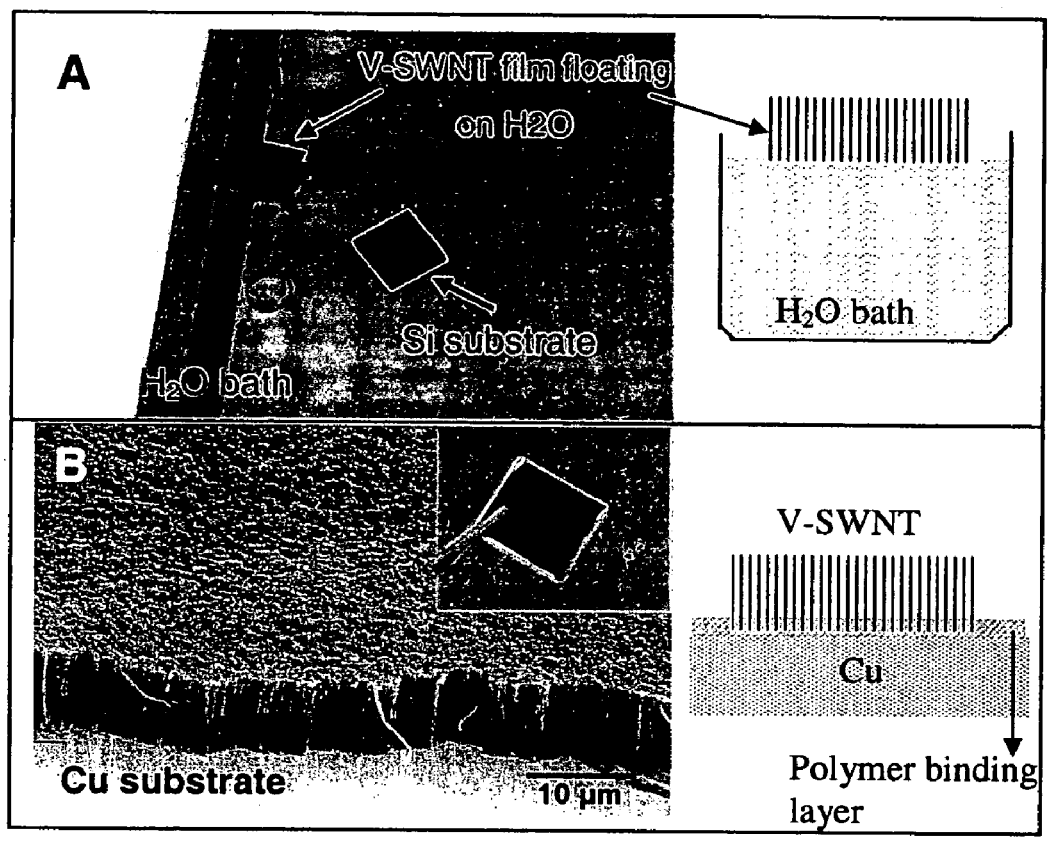
Figures 6a-b

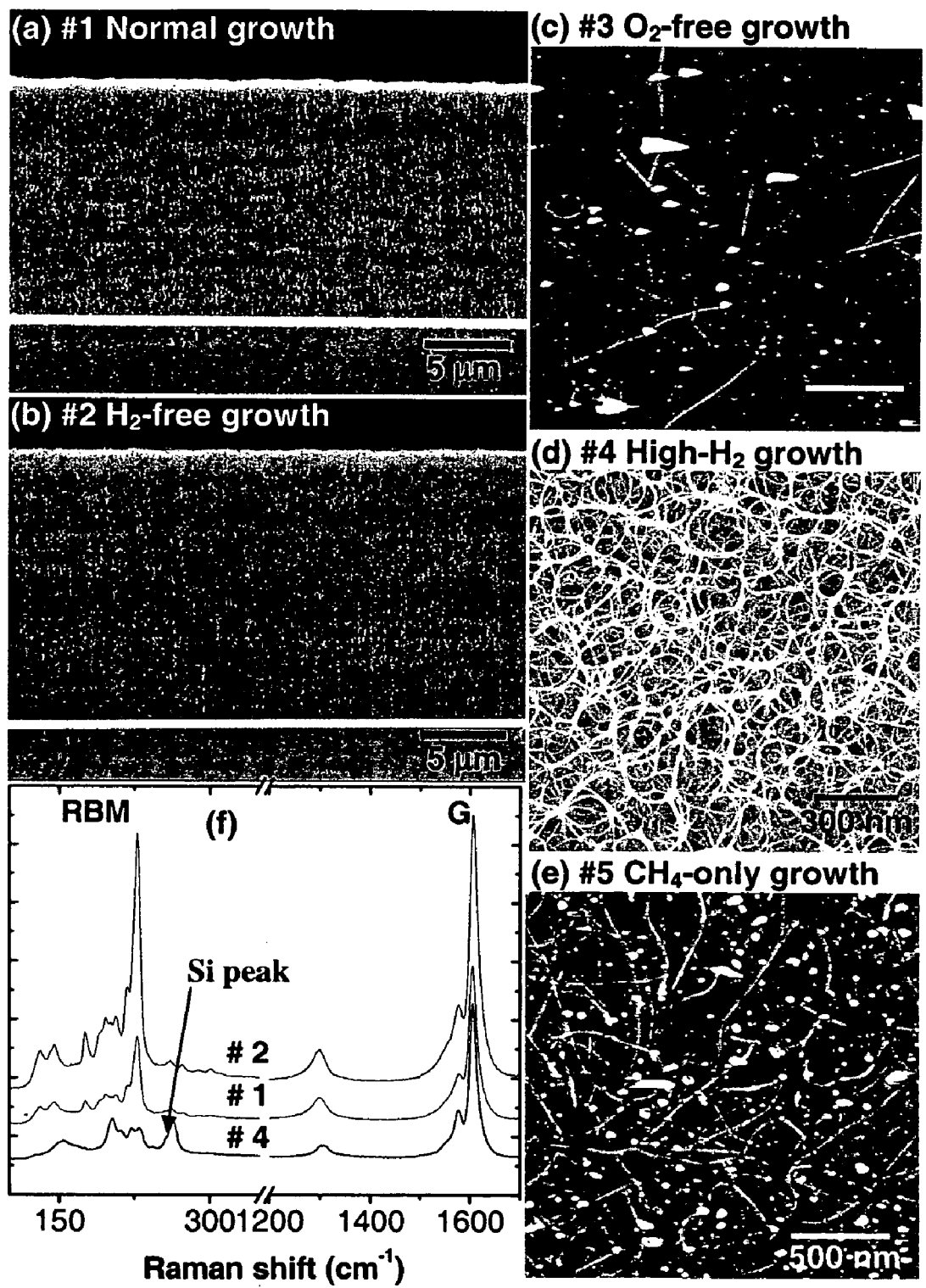
Figures 8a-f

SINGLE-WALLED CARBON NANOTUBES AND METHODS OF PREPARATION THEREOF

RELATED APPLICATIONS

This application claims the benefit of and priority to U.S. provisional application No. 60/731,042, filed Oct. 27, 2005 and U.S. provisional application No. 60/813,189, filed Jun. 12, 2006. The contents of these provisional applications are incorporated herein by reference.

BACKGROUND OF THE INVENTION

Carbon nanotubes (also referred to as carbon fibrils) are seamless tubes of graphite sheets, first discovered as multi-layer concentric tubes or multi-walled carbon nanotubes and subsequently as single-walled carbon nanotubes. Carbon nanotubes have shown promising applications including nanoscale electronic devices, high strength materials, electron field emission, tips for scanning probe microscopy, and gas storage.

Generally, single-walled carbon nanotubes (SWNTs) have advantages over multi-walled carbon nanotubes for use in these applications because they have fewer defects and are therefore stronger and more conductive than multi-walled carbon nanotubes of similar diameter. Moreover, single-walled carbon nanotubes with substantially uniform alignment have been shown to have further advantages over non-aligned nanotubes. For example, vertical single-walled carbon nanotubes (V-SWNTs), have attracted particular interest for some of the above applications.

In addition to their multiplicity and alignment, other physical parameters of carbon nanotubes also have important implications in their utility. For example, the level of purity is often vital to the applicability of carbon nanotubes in electronic devices. The control of physical dimensions of carbon nanotubes, such as diameter, length and chirality, is also of benefit, for example, in hydrogen storage applications. Nevertheless, current methods of preparation often suffer from narrow parameter windows and/or low reproducibility.

Thus, the availability of single-walled carbon nanotubes, particularly vertical single-walled carbon nanotubes, in quantities and with attributes necessary for practical technology is still problematic. As a result, processes for the production of high quality single-walled carbon nanotubes are still needed.

SUMMARY OF THE INVENTION

The present invention provides a method for the preparation of carbon nanotubes, such as single-walled carbon nanotubes, comprising:
 a) providing a gas stream comprising one or more carbon sources, wherein the gas stream is enriched in one or more oxygen sources, such as molecular oxygen; and
 b) depositing carbon from the one or more carbon sources on a substrate under growth conditions by chemical vapor deposition (CVD), for example, plasma enhanced chemical vapor deposition (PECVD),
thereby forming single-walled carbon nanotubes.

The present invention also provides for carbon nanotubes, such as single-walled carbon nanotubes, prepared by the methods described herein.

In certain embodiments, the present invention provides a method for adhering a carbon nanotube film to a surface, comprising:
 a) providing a carbon nanotube film on a substrate;
 b) transferring the carbon nanotube film from the substrate to a surface coated with a polymer; and
 c) heating the polymer to a temperature above the glass transition temperature of the polymer,
thereby adhering the carbon nanotube film to the surface.

In certain embodiments, the present invention provides another method for adhering a carbon nanotube film to a surface, comprising:
 a) providing a carbon nanotube film on a substrate;
 b) applying a surface coated with a first polymer to the carbon nanotube film opposite from the substrate; and
 c) heating the first polymer to a first temperature above the glass transition temperature of the first polymer,
thereby adhering the carbon nanotube film to the surface.

In some embodiments, the present invention provides a plastic, comprising:
 a surface;
 an axis perpendicular or oblique to the surface; and
 one or more carbon nanotubes,
wherein, the one or more carbon nanotubes are embedded along the axis into the surface.

BRIEF DESCRIPTION OF THE DRAWINGS

The following figures depict illustrative embodiments of the invention. These depicted embodiments are to be understood as illustrative of the invention and not as limiting in any way.

FIG. 1a depicts an AFM (atomic force microscopy) image of a sub-monolayer of Fe nanoparticles (1-2 nm in topographic height) formed on a $SiO_2/Si$ wafer used for the synthesis of single-walled carbon nanotubes.

FIG. 1b depicts an optical image of a visually black vertical SWNT film grown on a full 4-inch wafer. The tube-free region at the lower right of the wafer is a consequence of clamping during deposition of the Fe film.

FIG. 1c depicts a SEM (scanning electron microscopy) image showing the slanted view of a V-SWNT film grown on $SiO_2/Si$.

FIG. 1d depicts a SEM side-view of a V-SWNT film.

FIG. 1e depicts a Raman spectrum of a SWNT film, wherein the laser excitation wavelength is 785 nm.

FIG. 1f depicts a TEM image of SWNTs after being removed from the $SiO_2$ by sonication and then dispersed onto a TEM grid.

FIG. 2a depicts a SEM image showing SWNT towers with various widths (20 µm, 5 µm, 1 µm, 500 nm, 300 nm from left to right of the front region of the image) and vertical SWNT sheets (20 µm, 5 µm, 1 µm, 500 nm, 300 nm, 100 nm thick from top to bottom of the upper part of the image) after 30 min growth.

FIG. 2b depicts an AFM image of the patterned catalyst strips (bright 300 nm and 100 nm wide regions respectively) comprised of densely packed Fe nanoparticles used for the growth of the 300 nm and 100 nm thick vertical SWNT sheets (pointed by arrows) in FIG. 2a.

FIG. 2c depicts an AFM image of two of the patterned catalyst squares (300 nm in width) used for the growth of the smallest towers (pointed by an arrow, tilted due to high aspect ratio) in FIG. 2a.

FIG. 2d depicts a SEM image of square and circular towers of V-SWNTs from different growths than the sample in FIG. 2a illustrating the reproducibility of the synthesis.

FIG. 2e depicts a SEM images of lines of V-SWNTs from different growths than the sample in FIG. 2a illustrating the reproducibility of the synthesis.

FIG. 3a depicts a SEM of vertical SWNTs grown with $CH_4/O_2$ (Partial pressure of $O_2$=0.8%).

FIG. 3b depicts an AFM of SWNTs grown with $CH_4/H_2$ (Partial pressure of $H_2$=7.4%) under $O_2$-free conditions using the same catalyst/substrate and total pressure as in FIG. 3a, illustrating the very low yield of SWNTs.

FIG. 3c depicts a schematic illustration of the role of oxygen species in hydrocarbon based synthesis of SWNTs, wherein scavenging of reactive H-species by oxygen shuts off (shown by the cross) the negative H-effect to SWNT growth. The inset of FIG. 3c depicts optical emission spectrum (OES) recorded under V-SWNT growth conditions with $CH_4/H_2/O_2$ showing OH emission at 308.9 nm.

FIGS. 4a-b depict AFM images of nanotubes on a substrate recorded (a) before and (b) after $H_2$ plasma treatment (5% in Argon, total pressure 0.5 torr, RF power 20 W) at 500° C. for 10 mins.

FIGS. 5a-b depict SEM images (scale bar 500 nm) of nanotubes grown from silica-supported Fe/Co/Mo catalysts deposited on substrates by regular thermal CVD using ethanol as the carbon feedstock in the presence of a $H_2$ concentration of (a) 1.9% and (b) 9.6% respectively.

FIG. 6a depicts a V-SWNT film free-floating on water after lifted-off from a $SiO_2$/Si substrate by HF etching of the $SiO_2$ layer underlying the SWNTs. The right panel of FIG. 6a depicts a schematic drawing of the free-floating SWNT film with nanotubes held together by van der Waals interactions.

FIG. 6b depicts a SEM image of a vertical SWNT film after transferring onto a copper substrate with a thin polymer binding layer at the Cu-SWNT interface. The inset of FIG. 6b depicts a vertical SWNT film (black) on Cu. The right panel of FIG. 6b depicts a schematic drawing of the vertical nanotube film and the Cu interface.

FIGS. 8a-e depict SWNT growth results (SEM or AFM images) under various conditions: normal, $H_2$-free, $O_2$-free, high $H_2$, and $CH_4$ only growth, respectively.

FIG. 8f depicts Raman spectra obtained from SWNTs of FIGS. 8a, b, and d (spectra from SWNTs from FIGS. 8c, and e not obtainable due to the low SWNT yield).

DETAILED DESCRIPTION OF THE INVENTION

1. Definitions

Figure 7:
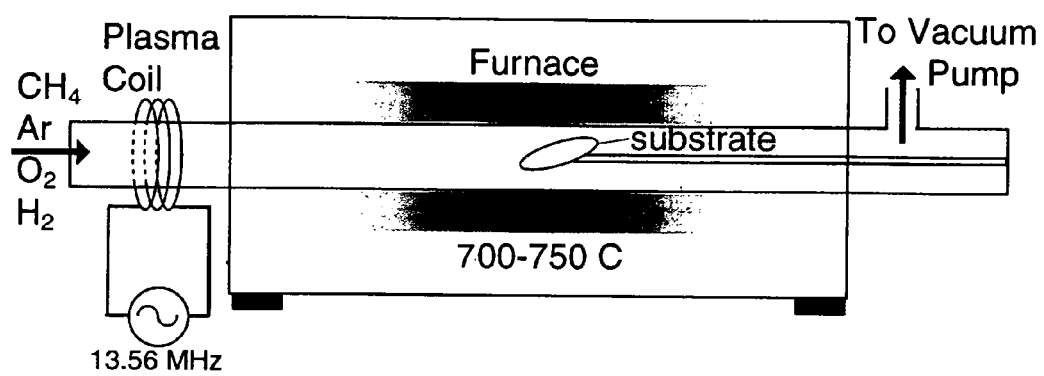
FIG. 7 depicts a schematic of the CVD system used for the vertical SWNT synthesis.

The term "alkane," as used herein, is art recognized and refers to a saturated aliphatic molecule, including straight-chain alkanes, branched-chain alkanes, cycloalkanes (alicyclic), alkyl-substituted cycloalkanes, and cycloalkyl-substituted alkane. In preferred embodiments, a straight chain or branched chain alkane has 30 or fewer carbon atoms in its backbone (e.g., $C_1$-$C_{30}$ for straight chains, $C_3$-$C_{30}$ for branched chains), and more preferably 20 or fewer. Likewise, preferred cycloalkanes have from 3-10 carbon atoms in their ring structure, and more preferably have 5, 6 or 7 carbons in the ring structure.

The term "alkene", as used herein, is art recognized and refers to an aliphatic molecule containing at least one double bond and is intended to include both "unsubstituted alkenes" and "substituted alkenes", the latter of which refers to alkenes having substituents replacing a hydrogen on one or more carbons of the alkene. Such substituents may occur on one or more carbons that are included or not included in one or more double bonds. Moreover, such substituents include all those contemplated for alkyl groups, as discussed below, except where stability is prohibitive. For example, substitution of alkenes by one or more alkyl, carbocyclyl, aryl, heterocyclyl, or heteroaryl groups is contemplated.

The term "alkyne", as used herein, is art recognized and refers to an aliphatic molecule containing at least one triple bond and is intended to include both "unsubstituted alkynes" and "substituted alkynes", the latter of which refers to alkynes having substituents replacing a hydrogen on one or more carbons of the alkyne. Such substituents may occur on one or more carbons that are included or not included in one or more triple bonds. Moreover, such substituents include all those contemplated for alkanes, as discussed above, except where stability is prohibitive. For example, substitution of alkynes by one or more alkyl, carbocyclyl, aryl, heterocyclyl, or heteroaryl groups is contemplated.

The phrase "catalyst seed" as used herein refers to any substance that can provide a location for the growth of carbon nanotubes. Some typical examples, of catalyst seeds include metal clusters, for example, transition metal clusters such as iron, cobalt, or molybdenum clusters. Catalyst seeds can be prepared on substrates as films (which may include various patterns), dots, lines, etc., as is commonly known in the art, for example, by standard deposition and/or lithographic methods.

The phrase "chemical vapor deposition" is art-recognized and as used herein refers to chemical reactions which convert matter from gas to solid phase, for example powders or films.

The phrase "plasma-enhanced chemical vapor deposition" or "plasma-assisted chemical vapor deposition" is art recognized and as used herein refers to a chemical vapor deposition process by which the gaseous substrates are converted to plasma. Plasma-enhanced chemical vapor deposition may allow enhanced rates of chemical reactions over non-plasma-enhanced depositions. Plasma-enhanced chemical vapor deposition may also facilitate deposition at lower temperatures than non-plasma-enhanced depositions.

The phrase "single-walled carbon nanotube" is art-recognized and as used herein refers to a graphene sheet rolled into a cylinder with a diameter from about 0.1 to about 100 nm, typically from about 0.5 nm to about 5 nm. Single-walled nanotubes as described herein can have closed ends, for example, by a fullerene hemisphere, or open ends or a combination thereof.

The phrase "vertical single-walled carbon nanotube" or "vertically aligned single-walled carbon nanotube" is art-recognized and as used herein refers to a single-walled nanotube grown on a substrate with a longitudinal axis perpendicular or substantially perpendicular to the surface of the substrate.

2. Methods

In certain embodiments, the present invention provides a method for the preparation of carbon nanotubes, particularly single-walled carbon nanotubes, comprising:

a) providing a gas stream comprising one or more carbon sources, wherein the gas stream is enriched in one or more oxygen sources, for example, molecular oxygen; and b) depositing carbon from the one or more carbon sources on a substrate under growth conditions by chemical vapor deposition (CVD), for example, plasma enhanced chemical vapor deposition (PECVD), thereby forming single-walled carbon nanotubes.

The present invention also provides carbon nanotubes, such as single-walled carbon nanotubes, prepared by the methods described herein.

Enrichment of the feed gas stream with one or more oxygen sources affords improved syntheses of single-walled carbon nanotubes by deposition. For example, the synthesis occurs in high yields to afford single-walled carbon nanotubes of high purity and with desired properties. Suitable oxygen sources include molecular oxygen, oxygen-containing organic compounds, oxygen-containing inorganic compounds, and combinations thereof.

In certain applications, oxygen-containing organic compounds suitable as oxygen sources include hydrocarbons, such as alkanes, alkenes, or alkynes, that have been substituted one or more times by oxygen, for example by hydroxy, oxo, carbonyl groups or combinations thereof. For example, suitable oxygen-containing organic compounds may include alcohols, such as alkyl alcohols, for example, lower alkyl alcohols such as methanol, ethanol, propanol, butanol, pentanol, etc. Suitable alcohols may also include poly-alcohols, i.e., alcohols with two or more hydroxy groups, for example, ethylene glycol, glycerol, propanediol, butanediol, etc. Suitable oxygen-containing organic compounds may also include carbonyl-containing compounds, such as aldehydes, ketones, carboxylic acids, esters, amides, carbonates, and substituted and unsubstituted derivatives thereof. Suitable aldehydes may include formaldehyde, acetaldehyde, propanal, etc. Suitable ketones may include acetone, mono- and di-hydroxyacetone, 2-butanone, etc. Suitable carboxylic acids may include formic acid, acetic acid, propionic acid, etc. Suitable esters may include methyl acetate, ethyl acetate, methyl propionate, etc. Suitable amides may include formamides, such as dimethylformamide, acetamides, propionamides, etc. Suitable carbonates may include dialkyl carbonates, such as dimethyl or diethyl carbonate, cyclic alkyl carbonates, such as ethylene carbonate, etc. Suitable oxygen-containing organic compounds may also include ethers, such as dimethyl ether, diethyl ether, dipropyl ether, dibutyl ether, and mixed ethers, such as methyl tert-butyl ether, methyl ethyl ether, etc. In some embodiments, a suitable oxygen source is an oxygen-containing organic compound with a molecular weight of less than about 200, 100, or 50.

In some embodiments, oxygen-containing inorganic compounds suitable as oxygen sources include oxygen containing compounds with no hydrocarbon groups. For example, carbon oxides, i.e., inorganic compounds comprising carbon and oxygen and optionally other atoms, may be used as oxygen sources. Suitable carbon oxides include carbon monoxide, carbon dioxide, and carbonic acid. Additional inorganic compounds suitable as oxygen sources include sulfur oxides, such as sulfur dioxide, sulfur trioxide, sulfuric acid, sulfurous acid, etc.; phosphorous oxides, such as phosphoric acid, phosphonic acid, phosphenic acid, phosphorous pentoxide, etc.; and nitrogen oxides, such as nitric acid, nitrous acid, nitrous oxide, nitric oxide, nitrogen dioxide.

The amount of enrichment by one or more oxygen sources can be tuned by the practitioner. For example, in some embodiments, the gas stream comprises at least about 0.01% of one or more oxygen sources, such as molecular oxygen, by partial pressure (or by mole), such as at least about 0.05% or at least about 0.1% by partial pressure. In certain instances, the gas stream comprises about 0.01% or about 0.05% to about 4% of one or more oxygen sources, such as molecular oxygen, by partial pressure, for example, about 0.1% to about 2% by partial pressure, for example, about 0.8% to about 1.2%, such as about 1% by partial pressure. Although excessive amounts of oxygen may reduce the yield of single-walled carbon nanotubes, suitable oxygen enrichment levels can be routinely determined by one of skill in the art by varying the amount of one or more oxygen sources in the gas stream. In certain instances, the gas stream comprises less than or about 4%, 3%, or 2% of one or more oxygen sources, such as molecular oxygen, by partial pressure. The amount of one or more oxygen sources in the gas stream may be adjusted to account for variations in the system employed for the preparation of the carbon nanotubes. For example, the amount of one or more oxygen sources may be adjusted as necessary to correlate with variations in the size of the gas stream source, plasma source, heating apparatus, synthesis chamber, substrate size, as well as growth conditions, such as temperature, pressure, magnetic field, etc. These modifications are within the abilities of the skilled artisan. In preferred embodiments, the amount of one or more oxygen sources in the gas stream is within operational safety limits, for example, within limits that avoid explosion and/or combustion of any oxygen or other gasses in the gas stream.

One or more oxygen sources can also be thought of in terms of enrichment in the number of oxygen atoms provided by the one or more oxygen sources. For example, an oxygen source containing n atoms of oxygen per molecule can be considered to provide enrichment of n atoms of oxygen or n atomic oxygen equivalents per molecule. Accordingly, one mole of an oxygen source containing n atoms of oxygen per molecule can be considered to provide enrichment of n moles of oxygen atoms or n moles of atomic oxygen equivalents. For example, a mole of methanol provides one mole of atomic oxygen equivalents, while a mole of molecular oxygen provides two moles of atomic oxygen equivalents. Thus, a partial pressure of methanol in a given gas stream would need to be twice as high as a partial pressure of molecular oxygen to provide an equivalent quantity of oxygen atoms to the feedstock. Accordingly, the skilled artisan can select or blend one or more oxygen sources and vary their concentrations to vary the number of oxygen atoms or atomic oxygen equivalents available in the gas stream or feedstock. For example, in some embodiments, the molar composition of the gas stream comprises at least about 0.01% of atomic oxygen equivalents, such as at least about 0.02%, 0.05%, 0.1%, or 0.2%. In certain instances, the molar composition of the gas stream comprises about 0.01%, 0.02%, 0.05%, or 0.1% to about 4% or 8% of atomic oxygen equivalents, for example, about 0.2% to about 4%, for example, about 1.6% to about 2.4%, such as about 2%. In certain instances, the molar composition of the gas stream comprises less than or about 8%, 6%, 4%, 3%, or 2% of atomic oxygen equivalents.

In some embodiments, the one or more oxygen sources does not substantially oxidize carbon under the growth conditions. In preferred embodiments, the one or more oxygen sources scavenges hydrogen radicals under the growth conditions.

In some instances, the gas stream comprises about 30% to about 95% of one or more carbon sources by partial pressure (or by mole), for example, 50% to about 80% of one or more carbon sources by partial pressure, such as about 60% to about 70% of one or more carbon sources by partial pressure. The carbon sources may be a single carbon species or may be more than one carbon species. In certain embodiments, the one or more carbon sources are easily vaporized, either at ambient or elevated temperatures. In preferred instances, one or more carbon sources are one or more hydrocarbons, such as alkanes, for example, lower alkanes, such as methane, ethane, propane, butane, pentane, etc., particularly methane or ethane; alkenes, for example, lower alkenes, such as ethylene, propylene, etc.; and/or alkynes, for example, lower alkynes, such as acetylene, propyne, butyne, etc. In certain instances, one or more carbon sources are not one or more hydrocarbons. For example, in some embodiments, one or more carbon sources include carbon monoxide, carbon dioxide, perhalogenated carbon species, etc. In some instances, one or more carbon sources includes a combination of both hydrocarbon and non-hydrocarbon carbon sources.

In certain embodiments, the gas stream comprises one or more additional gasses. For example, the gas stream may include molecular hydrogen, ammonia, water vapor, and or inert carrier gasses, such as nitrogen or noble gasses, for example, helium, neon, argon, krypton, and/or xenon, particularly argon.

In certain instances, the gas stream further comprises molecular hydrogen, for example, about 5% to about 20% molecular hydrogen by partial pressure (or by mole), such as about 10% to about 15% molecular hydrogen by partial pressure. In some embodiments, the ratio by partial pressure of one or more oxygen sources, such as molecular oxygen, to molecular hydrogen is about 1:50 or greater, such as about 1:22 or greater, about 1:15 or greater, about 1:12 or greater, about 1:6 or greater, or about 1:1 or greater. The amount of molecular hydrogen employed in the gas stream can be adjusted by the practitioner of the invention as necessary, for example, to tune the growth conditions to improve the yield and/or properties of the carbon nanotubes. In other embodiments, the gas stream is substantially free of molecular hydrogen (for example, greater than 98%, 99%, 99.9% or even 99.99% free of molecular hydrogen) or completely free of molecular hydrogen (for example, to the point of detection by conventional means). In some embodiments, if the gas stream contains hydrogen, the hydrogen is derived from one or more carbon sources, such as hydrocarbons. This hydrogen may result from decomposition of one or more carbon sources, such as hydrocarbons, under the growth conditions.

In some embodiments, the gas stream further comprises one or more inert gases, for example, about 2% to about 80% inert gas by partial pressure (or by mole), such as about 5% to about 40%, or about 15% to about 30% inert gas by partial pressure. In certain embodiments, at least one inert gas is argon.

In some instances, the gas stream further comprises water vapor. In some instances, the gas stream further comprises alcohol vapor, such as methanol, ethanol, or propanol vapor, e.g., in addition to or instead of water.

In certain embodiments, the chemical vapor deposition is plasma enhanced. For example, in some embodiments, the gas stream is converted to plasma, for example, generated at a power of about 0.1 W to about 2000 W, for example, about 1 W to about 1000 W, about 10 W to about 200 W, about 55 W to about 80 W, or about 60 W to about 70 W. In some instances, the plasma is generated by a plasma source with an infrared, microwave, or radio frequency. In some instances, the plasma enhanced chemical vapor deposition is microwave plasma enhanced chemical vapor deposition. In other instances, the plasma enhanced chemical vapor deposition is radio wave plasma enhanced chemical vapor deposition. For example, in some embodiments, the plasma is generated by a plasma source that has an inductively-coupled radio-frequency of about 10 MHz to about 20 MHz, such as about 13 MHz to about 14 MHz.

In some embodiments, the growth conditions comprise a temperature between about 300° C. and about 1100° C., for example, between about 500° C. and about 900° C., such as between about 600° C. and about 850° C., such as between about 700° C. and about 750° C.

In certain instances, the growth conditions comprise reduced pressure, for example a pressure less than atmospheric pressure, i.e., less than about 1 atm or about 760 mm Hg or about 760 Torr. In some applications, the growth conditions comprise a reduced pressure that is between about 1 mTorr and about 100 Torr, for example, between about 10 mTorr and about 1 Torr, between about 150 mTorr and about 600 mTorr, between about 250 mTorr and about 500 mTorr, or a pressure between about 300 mTorr and about 400 mTorr.

Generally, the substrate comprises any substance that is stable under the growth conditions. For example, suitable substrates are stable under reduced pressures, as described herein, and/or under the temperatures of the growth conditions.

In certain cases, the substrate comprises a metal, such as a transition metal, for example, copper, molybdenum, iron, cobalt, etc. In other embodiments, the substrate comprises a plastic and/or polymer. In some embodiments, the substrate is an inorganic, non-transition metal substance. For example, in certain embodiments, the substrate is aluminum-derived, such as aluminum oxide (alumina), or silicon-derived, such as silica. In preferred embodiments, the substrate is silicon-derived, for example, comprising $SiO_2$ and/or Si and/or compounds thereof.

In some instances, the substrate further comprises catalyst seeds. In some examples, the single-walled carbon nanotubes are prepared on the catalyst seeds; that is, the single-walled carbon nanotubes are synthesized on or grow from the catalyst seeds. In some embodiments, the catalyst seeds comprise a metal, such as, iron, cobalt, nickel, molybdenum, titanium, gold, platinum, palladium, lanthanum, magnesium, copper, aluminum, vanadium, chromium, manganese, or a combination thereof, particularly iron, cobalt, molybdenum, or a combination thereof. In certain embodiments, the catalyst seeds form a pattern on the substrate, for example, dots, lines, grids, shapes, letters, numbers, symbols, etc.

In some embodiments, the substrate is sized to afford large amounts of single-walled carbon nanotubes under the growth conditions. For example, in certain instances, the substrate has a large total surface area suitable for the growth of single-walled carbon nanotubes, and such area may contain catalyst seeds. In certain embodiments, the substrate has an area suitable for the growth of single-walled carbon nanotubes greater than or equal to about 0.25, 0.5, 1, 2, 4, 8, 12, 16, or 20 square inches, particularly greater than or equal to about 1, 2, or 4 square inches.

In some embodiments, the single-walled carbon nanotubes prepared by the present methods are of high purity. For example, the single-walled carbon nanotubes may be substantially free of multi-walled carbon nanotubes; that is, the carbon nanotubes may be over about 50%, 70%, 80%, 90%, 95%, 99%, 99.9%, or even 99.99% single-walled nanotubes as compared to multi-walled carbon nanotubes. In certain embodiments, the carbon nanotubes prepared by the present methods are 100% single-walled carbon nanotubes.

In some embodiments, the single-walled carbon nanotubes prepared by the present methods are substantially aligned single-walled carbon nanotubes; that is, over about 50%, 70%, 80%, 90%, 95%, 99%, 99.9%, or even 99.99% of the single-walled carbon nanotubes prepared by the present methods are aligned single-walled carbon nanotubes.

In certain examples, the single-walled carbon nanotubes are substantially vertically aligned single-walled carbon nanotubes, i.e., over about 50%, 70%, 80%, 90%, 95%, 99%, 99.9%, or even 99.99% of the single-walled carbon nanotubes prepared by the present methods are vertically aligned single-walled carbon nanotubes.

In some embodiments, the single-walled carbon nanotubes are substantially chiral single walled carbon nanotubes; that is, over about 50%, 70%, 80%, 90%, 95%, 99%, 99.9%, or even 99.99% of the single-walled carbon nanotubes prepared by the present methods are chiral single-walled carbon nanotubes.

In certain embodiments, the single-walled carbon nanotubes prepared according to the instant methods are prepared to form a film. The present methods can be used to prepare single-walled carbon nanotubes films with desired thicknesses. In some instances, the film is greater than about 50 nm, for example, greater than about 100 nm, 500 nm, 1 µm, 10 µm, 50 µm, 100 µm, or 500 µm thick.

The present methods can be used to prepare single-walled carbon nanotubes with desired average diameters. In certain embodiments, the single-walled carbon nanotubes are on average about 0.2 nm to about 5.0 nm in diameter, for example, about 0.5 nm to about 3.0 nm in diameter, such as about 1 nm to about 2 nm in diameter. In some embodiments, the single-walled carbon nanotubes have a diameter distribution of less than about 5 nm, less than about 2 nm, less than about 1 nm, less than about 0.5 nm, or less than about 0.2 nm.

In certain embodiments, the present invention provides a method for adhering a carbon nanotube film to a surface, comprising:
    a) providing a carbon nanotube film on a substrate;
    b) transferring the carbon nanotube film from the substrate to a surface coated with a first polymer; and
    c) heating the first polymer to a first temperature above the glass transition temperature of the first polymer,
thereby adhering the carbon nanotube film to the surface.

In some embodiments, step b) further comprises removing the carbon nanotube film from the substrate to provide a free carbon nanotube film.

In some instances, step b) further comprises floating the free carbon nanotube film on a liquid surface, for example a water surface, organic solvent surface, or ionic liquid surface, particularly a water surface.

In certain embodiments, the above method further comprises:
d) cooling the first polymer to a temperature below the glass transition temperature of the first polymer, thereby fixing the carbon nanotube film to the first polymer.

In certain embodiments, the present invention provides another method for adhering a carbon nanotube film to a surface, comprising:
    a) providing a carbon nanotube film on a substrate;
    b) applying a surface coated with a first polymer to the carbon nanotube film opposite from the substrate; and
    c) heating the first polymer to a first temperature above the glass transition temperature of the first polymer,
thereby adhering the carbon nanotube film to the surface.

In some embodiments, step c) further comprises cooling the first polymer to a temperature below the glass transition temperature of the first polymer, thereby fixing the carbon nanotube film to the first polymer.

In certain embodiments, the above method further comprises:
d) removing the substrate from the carbon nanotube film to provide a carbon nanotube film adhered to the surface.

In certain embodiments of the present methods, the substrate is aluminum-derived, such as aluminum oxide (alumina), or silicon-derived, such as silica. In preferred embodiments, the substrate is silicon-derived, for example, comprising $SiO_2$ and/or Si and/or compounds thereof. In some embodiments, for example, when the substrate is silicon-derived, removing the substrate comprises etching the substrate with a fluoride source, such as HF. In some embodiments, the substrate has an area with a carbon nanotube film greater than or equal to about 0.25, 0.5, 1, 2, 4, 8, 12, 16, or 20 square inches, particularly greater than or equal to about 1, 2, or 4 square inches.

In some embodiments, the first polymer acts as an adhesive to adhere the carbon nanotube film to the surface. For example, heating of the first polymer above its glass transition temperature may allow the carbon nanotube film to become partially embedded within the first polymer, such that on cooling, the first polymer hardens, thereby fixing or adhering the carbon nanotube film to the first polymer. In certain instances, the first polymer is polymethylmethacrylate (PMMA).

Generally, the surface to which the carbon nanotube film is adhered can be any surface compatible with the described methods. Suitable surfaces include polymers, plastics, metals, silicon-based surfaces, glasses, wood, paper, etc.

In certain embodiments, the surface is a metal, such as copper, a second polymer with a glass transition temperature greater than that of the first polymer, a glass, or a combination thereof. In some embodiments, the surface has an area for adhering a carbon nanotube film greater than or equal to about 0.25, 0.5, 1, 2, 4, 8, 12, 16, or 20 square inches, particularly greater than or equal to about 1, 2, or 4 square inches.

The present methods may allow for adhering of a carbon nanotube film to a surface that is sensitive to high temperatures; that is, the present methods for adhering the carbon nanotube film to the surface may not induce concurrent thermal decomposition of the surface. For example, in preferred embodiments, the surface decomposes at a temperature greater than that of the glass transition temperature of the first polymer. In some embodiments, the surface decomposes at a temperature greater than the first temperature. In preferred embodiments, the surface does not substantially decompose at about the first temperature. In some embodiments, the surface decomposes at a temperature greater than about 300° C., such as greater than about 500° C., for example, greater than about 700° C. In some instances, step c) comprises heating the first polymer to a temperature less than about 700° C., for example, less than about 500° C., such as less than about 300° C.

The carbon nanotube film adhered to a surface according to the present methods may comprise carbon nanotubes prepared according to methods described herein. For example, the carbon nanotube film may be comprised of aligned carbon nanotubes, such as vertically aligned carbon nanotubes. The carbon nanotube film may be comprised of chiral carbon nanotubes. In some instances, the carbon nanotube film is comprised of single-walled carbon nanotubes, such as vertical single-walled carbon nanotubes.

In certain embodiments, the carbon nanotube film adhered to a surface according to the present methods is greater than about 50 nm thick, for example, greater than about 100 nm thick, greater than about 500 nm thick, greater than about 1 µm thick, or greater than about 10 µm, 50 µm, 100 µm, or 500 µm thick. In some embodiments, the carbon nanotube film has an area greater than or equal to about 0.25, 0.5, 1, 2, 4, 8, 12, 16, or 20 square inches, particularly greater than or equal to about 1, 2, or 4 square inches.

3. Products

In certain embodiments, the present invention provides products or methods for providing products comprising carbon nanotubes, such as single-walled carbon nanotubes. In some embodiments, the present invention provides a plastic, comprising:
    a surface;
    an axis perpendicular or oblique to the surface; and
    one or more carbon nanotubes, wherein, the one or more carbon nanotubes are embedded along the axis into the surface.

As the one or more carbon nanotubes are embedded along the axis into the surface of the plastic, the one or more carbon nanotubes are embedded substantially perpendicular or oblique to the plane made by the surface at the point of embedment. In certain instances, the longitudinal axis of the one or more carbon nanotubes may be perpendicular or oblique to the surface of the plastic. In certain embodiments, the longitudinal axis of the one or more carbon nanotubes may be parallel or substantially parallel to an axis perpendicular or oblique to the surface of the plastic. In some embodiments, when an axis is oblique to the surface of the plastic, it is substantially perpendicular, for example, nearly or almost perpendicular, to the surface of the plastic or the plane made by the surface. In certain embodiments, the one or more carbon nanotubes are partially embedded into the surface; that is, a portion of one or more carbon nanotubes is on one side of the surface or the plane made by the surface, and a portion of one or more carbon nanotubes is on the opposite side of the surface or the plane made by the surface. In certain instances, one or more carbon nanotubes is partially embedded within the plastic.

In some instances, the plastic comprises one or more organic polymers, such as those having glass transition temperatures, for example, as described above for the first polymer. In some embodiments, the plastic comprises the first polymer as described above. For example, the plastic may comprise polymethylmethacrylate (PMMA). At temperatures above the glass transition temperature of the plastic, the plastic may behave more fluid and one or more carbon nanotubes embedded into the surface or within the plastic may become dislodged.

The one or more carbon nanotubes associated with the plastic include carbon nanotubes as described and referenced herein. For example, the one or more carbon nanotubes may comprise a film on the surface and the film may include properties, dimensions, and features as described herein. In some instances, the one or more carbon nanotubes may be single-walled carbon nanotubes, such as vertically aligned single-walled carbon nanotubes. For example, in such embodiments, the vertical alignment of the carbon nanotubes may be substantially perpendicular to the surface of the plastic or to a plane made by the surface of the plastic.

The surface of the plastic may include a variety of features, shapes, and topographies. For example, the surface of the plastic, may carve patterns, such as for circuitry, letters or numbers, such as for lithography, or other symbols or designs. The surface may also generally include projections, depressions, flat portions, or combinations of these. In certain instances, the majority or entirety of the surface is flat or substantially flat.

In certain examples, the plastic is disposed on a substrate or surface. The substrate or surface may include properties, dimensions, and/or features as described above for other substrates or surfaces. For example, the substrate may be aluminum-based or silicon-based, as described herein. Furthermore, the substrate may be a metal, such as copper, a polymer with a glass transition temperature greater than that of the plastic, a glass, or a combination thereof.

In some instances, the present methods for adhering a carbon nanotube film to a surface provide a plastic of the invention.

Variations, modifications, and other implementations of what is described herein will occur to those of ordinary skill without departing from the spirit and the scope of the invention. Accordingly, the invention is not to be limited only to the preceding illustrative description. For additional illustrative features that may be used with the invention, including the embodiments described here, refer to the documents listed herein above and incorporated by reference in their entirety. All operative combinations between the above described illustrative embodiments and those features described U.S. Pat. Nos. 6,994,907; 6,986,876; 6,967,013; 6,949,237; 6,331,209; 6,232,706; U.S. Provisional Application No. 60/731,042; Li, W., Xie, S., Qian, L. & Chang, B. (1996) *Science* 274, 1701-1703; Ren, Z. F., Huang, Z. P., Xu, J. W., Wang, J. H., Bush, P., Siegal, M. P. & Provencio, P. N. (1998) *Science* 282, 1105-7; Fan, S., Chapline, M., Franklin, N., Tombler, T., Cassell, A. & Dai, H. (1999) *Science* 283, 512-514; Jiang, K. L., Li, Q. Q. & Fan, S. S. (2002) *Nature* 419, 801-801; Dai, H. (2002) *Surf Sci.* 500, 218-241; Melechko, A. V., Merkulov, V. I., McKnight, T. E., Guillorn, M. A., Klein, K. L., Lowndes, D. H. & Simpson, M. L. (2005) *J. Appl. Phys.* 97, 041301; Murakami, Y., Chiashi, S., Miyauchi, Y., Hu, M. H., Ogura, M., Okubo, T. & Maruyama, S. (2004) *Chem. Phys. Lett.* 385, 298-303; Hata, K., Futaba, D. N., Mizuno, K., Namai, T., Yumura, M. & Iijima, S. (2004) *Science* 306, 1362-4; Li, Y. M., Mann, D., Rolandi, M., Kim, W., Ural, A., Hung, S., Javey, A., Cao, J., Wang, D. W., Yenilmez, E., Wang, Q., Gibbons, J. F., Nishi, Y. & Dai, H. J. (2004) *Nano Lett.* 4, 317-321; Jorio, A., Saito, R., Hertel, T., Weisman, R. B., Dresselhaus, G. & Dresselhaus, M. S. (2004) *MRS Bulletin*, 276-80; Benndorf, C., Joeris, P. & Kroger, R. (1994) *Pure & Appl. Chem.* 66, 1195-1206; Eaton, S. & Sunkara, M. K. (2000) *Diamond and Related Mater.* 9, 1320-1326; Nikitin, A. et al. (2005) Phys. Rev. Lett. 95, 225507; Park, S., Srivastava, D. & Cho, K. (2003) *Nano Lett.* 3, 1273-1277; Nikolaev, P., Bronikowski, M. J., Bradley, R. K., Rohmund, F., Colbert, D. T., Smith, K. A. & Smalley, R. E. (1999) *Chem. Phys. Lett.* 313, 91-97; Kitiyanan, B., Alvarez, W. E., Harwell, J. H. & Resasco, D. E. (2000) *Chem. Phys. Lett.* 317, 497-503; Kong, J., Soh, H., Cassell, A., Quate, C. F. & Dai, H. (1998) *Nature* 395, 878; Hafner, J., Bronikowski, M., Azamian, B., Nikolaev, P., Colbert, D. & Smalley, R. (1998) *Chem. Phys. Lett.* 296, 195-202; and Zhang, G. et al. (2005) *PNAS.* 102, 16141-16145 are considered to be potentially patentable embodiments of the invention.

Exemplification

The invention now being generally described, it will be more readily understood by reference to the following examples which are included merely for purposes of illustration of certain aspects and embodiments of the present invention, and are not intended to limit the invention.

1. Methods of Single-Walled Nanotube Preparation

Nanotube synthesis was carried out in a 4-inch thermal CVD system with an inductively coupled radio-frequency (RF, 13.56 MHz) plasma source located near the entrance of the growth gases. The substrates used were SiO2/Si with nominally 1 to 2 Å-thick Fe films (by quartz crystal thickness monitoring) deposited by electron beam evaporation. The thin Fe film was first annealed in oxygen at 550° C. for 10 min and then heated in hydrogen to the growth temperature of 720° C. This treatment produced nearly a monolayer of Fe clusters on $SiO_2$ with an average diameter of ~1.3 nm as estimated from atomic force microscopy (AFM) measurements. It was found that the formation of dense and relatively uniform particles was beneficial for V-SWNT growth. During nanotube growth, the compositions of gases in the tube-furnace were methane (~66%), hydrogen (~12%), oxygen (~1%) and Ar (~21% as carrier gas) with a total pressure of 0.3-0.4 Torr. The gas flow rates were $CH_4/H_2/O_2$=160 sccm/

30 sccm/2.4 sccm (standard cubic centimeter per minute). Ar was used as carrier gas for $CH_4$ and $O_2$. The percentage of partial pressures of various gases followed $CH_4$:$H_2$:$O_2$=66%: 12%:1% (The rest is Ar). The RF plasma was generated at a power of 60-70 W for 10 to 30 min for nanotube growth. This condition was highly reproducible in growing vertical SWNTs from run to run and day to day.

2. Results and Discussions

The present method produced nearly a monolayer of Fe clusters on 4-inch wafer scale $SiO_2$ (FIG. 1a) substrates with an average diameter of ±1.3 nm as estimated from atomic force microscopy (AFM) measurements. It was found that the formation of dense and relatively uniform particles was beneficial for V-SWNT growth. With the sub-monolayer catalyst seeds and ~1% oxygen added to the CVD, uniformly black nanotube films were grown on full 4-inch wafers (FIG. 1b). Scanning electron microscopy (SEM) revealed that the films consisted of nanotube strands oriented vertically to the substrate (FIGS. 1c and 1d). The length of the nanotubes is ~10 μm for 10 min growth and scaled approximately with growth time. Transmission electron microscopy (TEM) revealed exclusively SWNTs without any MWNTs or double-wall tubes (FIG. 1f). The TEM grids were prepared by sonicating a V-SWNT covered substrate in a solvent and then drop-drying the suspension on the grid. Raman spectroscopy (FIG. 1e) of the as-grown samples identified resonant radial breathing modes (RBM) of nanotubes in the range of 132 $cm^{-1}$ to 230 $cm^{-1}$, corresponding to nanotubes 1 to 2 nm in diameter. The clear separation between the G peaks at ~1580 $cm^{-1}$ and ~1610 $cm^{-1}$ (FIG. 1e) is also characteristic of SWNTs. By forming densely packed catalytic seed particles in lithographically defined regions shaped in squares, circles or strips, V-SWNTs were grown to form square towers, circular towers or sheets replicating the shape of the catalytic regions (FIG. 2) with the thickness of the sheets down of ~100 nm (FIG. 2a).

The V-SWNT synthesis results are highly reproducible and the $O_2$ concentration of ~1% can be easily controlled experimentally. The vertical orientation of SWNTs is indicative of high yield growth with close to one-to-one growth of nanotubes from the seed particles. Through control experiments (FIG. 3a, 3b) with varying concentrations of gases at a fixed temperature and total pressure, several growth trends emerged and shed light on the role played by oxygen in high yield nanotube formation. Without the addition of $O_2$, the same dense-catalyst monolayer failed to produce high yield of SWNTs packing into vertical films under any conditions tested. Vertical SWNTs can be grown using $CH_4$/$O_2$ without the addition of molecular hydrogen (FIG. 3a). Growth in $CH_4$/$H_2$ gave low yield of SWNTs (FIG. 3b). These results indicated that H-rich conditions do not favor SWNT growth.

The results indicate that role played by oxygen in enhancing SWNT growth is the removal of reactive H radicals (relative to C-species) that exist in hydrocarbon based growth of nanotubes, and that high concentrations of H species do not favor the formation and growth of $sp^2$-like SWNTs (FIG. 3). Combinations of $CH_4$/$H_2$/$O_2$ gases have been used previously for carbon deposition, but rather for $sp^3$ diamond synthesis and under $H_2$ rich (>90%) and low $CH_4$ (several percent) conditions (see Benndorf et al. *Pure & Appl. Chem.* 1994, 66, 1195-1206 and Eaton et al. *Diamond and Related Mater.* 2000, 9, 1320-1326). Optical emission spectroscopy (OES, FIG. 3c inset) was carried out using a 52000 miniature fiber optic spectrometer (Ocean Optics Inc.), wherein a UV grade quartz fiber was used to guide the plasma emission to the spectrometer. The OES established that adding oxygen to the $CH_4$/$H_2$ plasma removes the highly reactive H radicals via $H+O_2 \rightarrow OH+O$ with a large rate constant of $k_{i0} \sim 10^{17}$ $cm^3$/mol·s. Oxygen can also remove and convert C-species into CO via various reactions, but with lower rate constants (~$10^{14}$ $cm^3$/mol·s). Addition of $O_2$ to $CH_4$/$H_2$CVD can therefore provide an effective route to tune the ratio between C. and H. species. It has been found that low C./H. ratios (H.-rich) favors the formation of $sp^3$ structures, and high C./H. ratios favor $sp^2$ carbon formation. Thus, the $sp^2$ and $sp^3$ carbon formation regimes can be controlled by changing oxygen concentration. These SWNT growth results under varying $H_2$ and $O_2$ conditions suggest that high yield synthesis with $CH_4$/$H_2$/$O_2$ or $CH_4$/$O_2$ results from oxygen removing H., which removes or greatly reduces the negative effect of H species on SWNT growth (FIG. 3c).

The results suggest that a favorable synthesis condition for SWNTs employs a carbon feedstock with reduced amounts of H-species. Although this poses an apparent dilemma for hydrocarbonbased synthesis of SWNTs, since H. is an inevitable product of hydrocarbon decomposition, controlled addition of oxygen can be used to scavenge H., enhancing the C./H. ratio and thus favoring $sp^2$ carbon production. High concentrations of reactive H. species are unfavorable to SWNT formation and growth due to attacking of the $sp^2$ C by H. to form $sp^3$ structures, giving low yield growth of SWNTs (FIG. 3). Notably, hydrogenation and etching of SWNTs by H radicals generated in a plasma is known to occur even at room temperature (see for example, Nikitin, A. et al. (2005) Phys. Rev. Lett. 95, 225507). To confirm hydrogen attacking of SWNTs, we carried out control experiments and observed etching of pre-formed SWNTs by hydrogen plasma under various conditions ranging from room temperature to our typical growth temperature (FIG. 4). Nanotubes on a substrate were subjected to $H_2$ plasma treatment, (5% in Argon, total pressure 0.5 ton, RF power 20 W) at 500° C. for 10 mins, and their AFMs recorded before (FIG. 4a) and after (FIG. 4b) treatment. The treatment was carried out in the same chamber used for growth of the V-SWNTs with only the $H_2$/Ar gas flow. The after etching image in FIG. 4b clearly shows that some of the nanotubes in FIG. 4a were etched by H-plasma. SWNTs are also found to be etched by H-plasma at room temperature. This result provided direct evidence of the negative effect of reactive H species to the structures of SWNTs.

Without oxygen, the yield of SWNTs of any appreciable length is low, demonstrating the importance of oxygen in the initial nanotube nucleation and formation stage and not just during the sustained growth stage. Increased $H_2$ presence often leads to systematic decrease in SWNT yield, with or without oxygen presence (see Supplementary Information). In our case, due to plasma assisted decomposition, any $H_2$ leads to very high H. concentrations, much more so than in thermal CVD. Thus, the observed low yield of SWNTs for $CH_4$/$H_2$ growth ($H_2$<10%) suggests the negative blocking effect of H-species to SWNT growth. With this negative H-effect identified, the favorable enhancement effect of oxygen via removal of H-species is illustrated (FIG. 3a vs. FIG. 3b). Indeed, optical emission spectroscopic measurement under $CH_4$/$H_2$/$O_2$ PECVD conditions clearly identified significant OH species (FIG. 3c inset), lending direct spectroscopic evidence of the reaction of oxygen with H-species in the present SWNT growth conditions.

H-scavenging by oxygen species could also be a factor in the high-yield SWNT growth by other methods, even though the precursors of oxidizing species differ. A control experiment was performed to elucidate the effect of hydrogen to the growth yield of SWNT in the alcohol CVD growth process (FIGS. 5a-b). During the experiment, 300 sccm of forming gas (3% $H_2$ in Argon) was bubbled through EtOH held at −9°

C. in both growths. In addition to the bubbling forming gas, sample A (FIG. 5a) had an additional 170 sccm of dry Argon flow, and sample B (FIG. 5b) had 35 sccm dry Argon and 135 sccm dry $H_2$ flows. The particles seen in the images are silica with supported catalytic metal species. The catalyst was made of Fe:Co:Mo (molar ratio 1:1:0.2) acetate salts dissolved in anhydrous ethanol and sonicated with silica (0.72 mmol metal/1 g Silica). The silica catalyst was deposited on a large silicon piece via spin coating. After spin-coating, the chip was cut into two pieces, and one was used for (A) and the other for (B). The yield of nanotubes was significantly higher in (A) than in (B). Surface 'sheet' resistance for (A) and (B) were 25KΩ and 1.2MΩ, respectively. It was observed that increasing the $H_2$ concentration while keeping the alcohol vapor pressure constant systematically reduces the yield of nanotubes. This provides evidence that hydrogen rich environments are also undesirable and have negative effects to the yield of SWNTs in standard thermal CVD. Further, a connection can be made with non-hydrocarbon based SWNT synthesis methods such as carbon monoxide CVD. CO-CVD without the involvement of hydrogen indeed produces high yield of SWNTs especially under high temperature and pressure when sufficient C-feedstock is obtained. Other H-free high-yield growth of SWNTs includes laser ablation and arc-discharge that vaporizes solid carbon without involving any hydrogen.

A major difference between PECVD and thermal CVD is the much higher concentration of reactive radicals in the former. Small variations in the concentrations of molecules in PECVD can strongly affect the outcome of SWNT growth, as shown here (FIG. 3). For thermal CVD, the effect of varying the hydrogen concentration is much less pronounced than in the PECVD case but still noticeable. Two advantages of PECVD over thermal CVD are the efficient decomposition of gas molecules and the fact that the concentration of reactive species can be sensitively tuned by the precursor concentration. Previously, many studies have carried out PECVD synthesis of carbon nanostructures but have not succeeded in producing high yield SWNTs. However, by adding suitable amounts of oxygen to the various types of PECVD systems, and by using dense and relatively uniform catalyst particles, production of SWNTs, such as vertically aligned SWNTs, at high yields was realized.

An effect of H-species on the diameter distribution of SWNTs synthesized by CVD was also observed. The blocking of SWNT formation by reactive H-species is more pronounced for smaller diameter tubes, since smaller SWNTs are more susceptible to hydrogenation by H-species due to higher tube curvature and a higher $sp^a$ formation tendency. In the H-plasma etching experiments, it was observed that smaller SWNTs tended to be attacked preferentially over larger ones, as seen in the AFM images in FIG. 4. This is also consistent with the observation that oxygen-free hydrocarbon CVD generally produce large (2-3 nm) SWNTs with few tubes≦1 nm (when particles of various sizes<~4-5 nm exist) (see Kong et al. 1998). In stark contrast, without hydrogen, CO based CVD methods are well known to produce abundant SWNTs in the 0.7-1.5 nm range (see Hafner at al. 1998). The present $O_2$ assisted $CH_4$ PECVD presented here also synthesizes abundant SWNTs in the 1 nm range (see Raman data in FIG. 1e) and also sub nm range. The growth of vertical MWNTs is less affected by H-blocking due to the higher stability of larger tubes and have been readily achieved by hydrocarbon CVD without any oxygen assistance.

3. Methods of Carbon Nanotube Film Transfer

A method for obtaining vertically aligned SWNTs on a wide range of substrates including metals and polymers is also disclosed. This goal has been elusive thus far due to the incompatibility of many types of substrates with the high growth temperature of SWNTs, but is important in the utility of aligned SWNT materials. V-SWNTs, or films of V-SWNTs, were "lifted-off" by using HF (1% for 10 s) to etch the underlying $SiO_2$ layer and subsequently free-floating the V-SWNT film on a water surface (FIG. 6a). Following lift-off, the V-SWNTs were transferred to other substrates coated with an interfacial thin polymer (50 nm polymethylmethacrylate PMMA) layer for adhesion (FIG. 6b). After transfer, the substrate was heated to >190° C., well above the glass transition temperature of PMMA (~105° C.) for melting of the polymer layer and 'gluing' the substrate to the ends of the SWNTs in the vertical film. This afforded strongly adhered vertical SWNTs on various substrates including Cu (FIG. 6b inset), polymers, and glasses. The V-SWNT films thus derived are robust and do not lift off from substrates even after immersion in ethanol or acetone solvents. This development greatly expands the utility of V-SWNTs. For instance, vertically aligned SWNT films can be used as a thermal interface material for heat conduction and dissipation for microelectronics. A low temperature process is needed to form V-SWNTs on these chips without harming the pre-formed circuitry. The present room temperature SWNT transfer approach meets this challenge.

4. Conclusions

A molecular oxygen-assisted plasma-enhanced CVD growth of high yield of vertically aligned SWNTs at the full 4-inch wafer scale is presented. Various control experiments revealed the negative effect of hydrogen species to the formation and growth of SWNTs as well as etching effects of hydrogen plasma to pre-formed SWNTs. The key role played by oxygen in the present high yield SWNT growth is to balance C and H radicals, and specifically to provide a C-rich and H-deficient condition to favor the formation of $sp^2$-like graphitic structures. In addition to molecular oxygen, other oxygen sources, such as oxygen-containing organic and inorganic compounds, can also produce high yields of vertically aligned SWNTs. With the addition of suitable amount of an oxygen-containing source to suppress H species, various types of PECVD setups can produce SWNTs at ultra-high yield and efficiency.

Further, a method to form V-SWNT films for the first time on any desirable substrate (including metals and plastics) with strong interfacial adhesion is presented.

5. Supplementary Information

A 4-inch CVD system was used for the SWNT synthesis. A schematic drawing of the system used for the nanotube synthesis is depicted in FIG. 7.

FIGS. 8a-e depict results of growth experiments (SEM or AFM images) under various conditions. FIG. 8f depicts a Raman spectra obtained with the various samples except for #3 and #5 due to the low SWNT yield. All of the growth experiments were carried out on identically prepared substrates with the same sub-monolayer Fe nanoparticle catalyst. All growth runs were carried out at the same temperature (720° C.) and total pressure (0.34 ton) and plasma power (70 W) for the same amount of time of 10 min. Specific growth conditions are as follows.

Growth Run #1 (FIG. 8a): Regular (normal) growth condition result with $CH_4/H_2/O_2$. Partial pressure $H_2:O_2=12\%$: 1% (very high yield, SWNTs grown into vertical films).

Growth Run #2 (FIG. 8b): $H_2$-free growth condition (no $H_2$ flow used in growth). $CH_4/O_2$ only. Partial pressure of $O_2$=0.8% (very high yield, SWNTs grown into vertical films). Removal of $H_2$ from the regular growth condition can still afford high yield growth, after adjusting down $O_2$ partial pressure. $H_2$ is not essential in under regular conditions but can be added for balancing purposes.

Growth Run #3 (FIG. 8c): $O_2$-free growth condition (no $O_2$ flow used in growth.) $CH_4/H_2$ only. Partial pressure of $H_2$=7.4% (very low yield of SWNT with $H_2$ but no $O_2$ in growth).

Growth Run #4 (FIG. 8d): A $CH_4/H_2/O_2$ growth condition with high $H_2$ concentration. $H_2$:$O_2$=22%:1% (>12%:1% in regular optimum growth condition in #1). (Adding excessive $H_2$ gives lower yield than #1 and fails to produce vertically packed SWNTs. Rather, a mat of SWNTs lying on the substrates was formed).

Growth Run #5 (FIG. 8e): $CH_4$ only growth (yield higher than $CH_4/H_2$ growth in #3, but cannot grow packed V-SWNTs).

General Trends: (1) Vertical SWNTs were not grown without $O_2$ for the $CH_4$ PECVD method (in, e.g., runs #3, #4, #5). (2) Higher $H_2$ conditions give lower yield of SWNTs. For $CH_4/H_2/O_2$ conditions, increasing $H_2$ gives lower yield (e.g., run #4 vs. #1). $CH_4/H_2$ (#3) yield lower than $CH_4$ alone (#5) growth.

EQUIVALENTS

Those skilled in the art will recognize, or be able to ascertain using no more than routine experimentation, numerous equivalents to the compounds and methods of use thereof described herein. Such equivalents are considered to be within the scope of this invention and are covered by the following claims.

The contents of all references, patents and published patent applications cited throughout this application, as well as their associated figures are hereby incorporated by reference in entirety.

The invention claimed is:

1. A plastic, comprising:
    a surface;
    an axis perpendicular or oblique to the surface; and
    one or more single-walled carbon nanotubes are embedded along the axis into the surface and extending from the surface.

2. The plastic of claim 1, wherein the one or more single-walled carbon nanotubes are partially embedded into the surface.

3. The plastic of claim 1, wherein the one or more single-walled carbon nanotubes comprise a film on the surface.

4. A method for adhering a carbon nanotube film to a surface, comprising:
    a) providing a gas stream including carbon and oxygen and using the gas stream to grow a carbon nanotube film including single-walled carbon nanotubes on a substrate, while using the oxygen to mitigate the formation of hydrogen radicals during the growth of the single-walled carbon nanotubes;
    b) transferring the carbon nanotube film from the substrate to a surface coated with a first polymer; and
    c) heating the first polymer to a first temperature above the glass transition temperature of the first polymer, thereby adhering the free carbon nanotube film to the surface.

5. The method of claim 4, wherein step b) further comprises removing the substrate to provide a free carbon nanotube film.

6. The method of claim 4, wherein step c) further comprises cooling the first polymer to a temperature below the glass transition temperature of the first polymer, thereby fixing the carbon nanotube film to the first polymer.

7. The method of claim 4, wherein the method further comprises:
    d) removing the substrate from the carbon nanotube film to provide a carbon nanotube film adhered to the surface.

8. The method of any one of claim 5 or 7, wherein removing the substrate comprises etching the substrate with a fluoride source.

* * * * *